US012678963B2

(12) United States Patent　(10) Patent No.:　US 12,678,963 B2
Tchuiev et al.　(45) Date of Patent:　Jul. 14, 2026

(54) DEVICE AND METHOD FOR CONTROLLING A ROBOT

(71) Applicant: Robert Bosch GmbH, Stuttgart (DE)

(72) Inventors: Vladimir Tchuiev, Haifa (IL); Yakov Miron, Haifa (IL); Dotan Di Castro, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 377 days.

(21) Appl. No.: 18/152,499

(22) Filed: Jan. 10, 2023

(65) Prior Publication Data

US 2023/0226699 A1　Jul. 20, 2023

(30) Foreign Application Priority Data

Jan. 18, 2022　(EP) ..................................... 22152066

(51) Int. Cl.
B25J 9/16　　　(2006.01)
B25J 13/08　　(2006.01)

(52) U.S. Cl.
CPC ........... B25J 9/1697 (2013.01); B25J 9/1607 (2013.01); B25J 9/161 (2013.01); B25J 9/163 (2013.01); B25J 13/08 (2013.01)

(58) Field of Classification Search
CPC ........ B25J 9/1697; B25J 9/1607; B25J 9/161; B25J 9/163; B25J 9/1602; B25J 13/08;
(Continued)

(56) References Cited

U.S. PATENT DOCUMENTS 8,958,912 B2 *　2/2015　Blumberg .............. B25J 9/1682
　　　　　　　　　　　　　　　　　　　700/259
9,327,406 B1 *　5/2016　Hinterstoisser ........ B25J 9/1697
(Continued)

FOREIGN PATENT DOCUMENTS

JP　　　　2003335417 A　*　11/2003　............. B65G 47/90

OTHER PUBLICATIONS

Caccavale et al. "A Distributed Algorithm for Mapping the Graphical Structure of Complex Environments with a Swarm of Robots," 2017 IEEE International Conference on Robotics and Automation (IRCA) (2017); pp. 1459-1466.
(Continued)

*Primary Examiner* — Ellis B. Ramirez
(74) *Attorney, Agent, or Firm* — NORTON ROSE FULBRIGHT US LLP

(57)　　　　ABSTRACT
A method for controlling a robot device. The method includes acquiring an image(s) of in a workspace of the robot device; determining, by a neural network, object hierarchy information specifying stacking relations of the objects with respect to each other in the workspace of the robot device and confidence information for the object hierarchy information from the image(s); if the confidence information indicates a confidence above a confidence threshold, manipulating an object of the objects; if the confidence information indicates a confidence lower than the confidence threshold, acquiring an additional image of the objects and determining, by the neural network, additional object hierarchy information specifying stacking relations of the objects with respect to each other in the workspace of the robot device and additional confidence information for the additional object hierarchy information from the additional image and control the robot using the additional object hierarchy information.

5 Claims, 5 Drawing Sheets

(58) Field of Classification Search
    CPC ........... B25J 13/00; G05B 2219/40053; G05B
                                                    2219/40532
    USPC ......... 700/245, 259; 706/12; 901/27, 30, 46;
                                        414/788.1, 788.4, 923
    See application file for complete search history.

(56)                    References Cited

U.S. PATENT DOCUMENTS

| | | | |
|---|---|---|---|
| 2010/0222915 A1* | 9/2010 | Kuehnemann | G06Q 10/08 |
| | | | 706/14 |
| 2010/0324729 A1* | 12/2010 | Ruge | B65G 47/90 |
| | | | 700/245 |
| 2016/0016311 A1* | 1/2016 | Konolige | B25J 9/1664 |
| | | | 901/30 |
| 2019/0070734 A1 | 3/2019 | Wertenberger et al. | |
| 2020/0269429 A1* | 8/2020 | Chavez | B25J 15/0616 |
| 2021/0347051 A1 | 11/2021 | Ye et al. | |
| 2023/0169675 A1* | 6/2023 | Tang | G06T 7/12 |
| | | | 382/103 |

OTHER PUBLICATIONS

Carion et al. "End-To-End Object Detection with Transformers,"
ArXiv (2020); pp. 1-26.

* cited by examiner

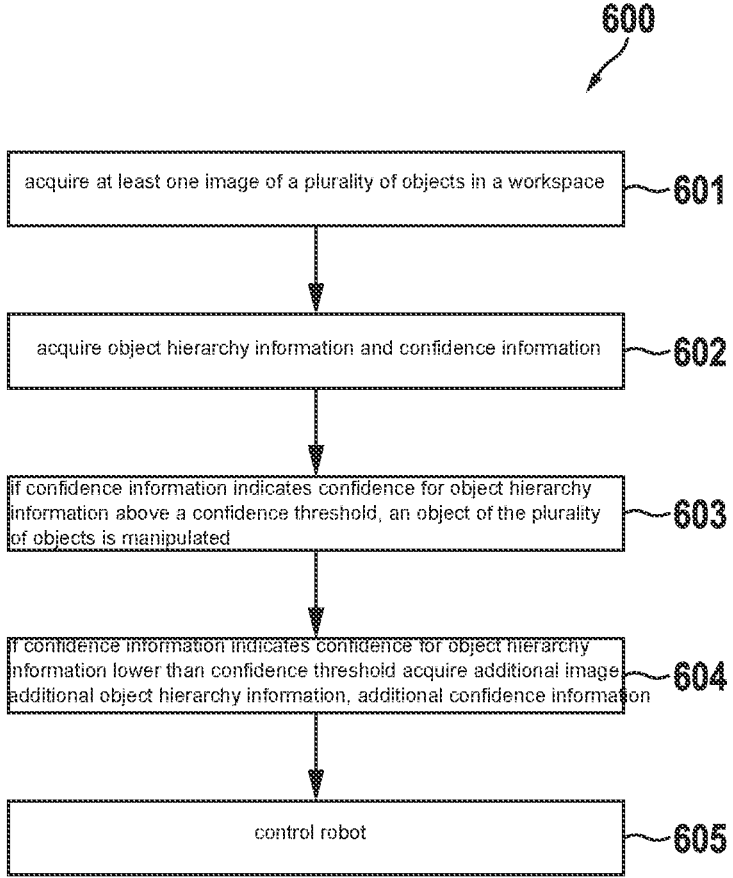

600

| acquire at least one image of a plurality of objects in a workspace | ~601 |

| acquire object hierarchy information and confidence information | ~602 |

| if confidence information indicates confidence for object hierarchy information above a confidence threshold, an object of the plurality of objects is manipulated | ~603 |

| if confidence information indicates confidence for object hierarchy information lower than confidence threshold acquire additional image, additional object hierarchy information, additional confidence information | ~604 |

| control robot | ~605 |

Fig. 6

DEVICE AND METHOD FOR CONTROLLING A ROBOT

CROSS REFERENCE

The present application claims the benefit under 35 U.S.C. § 119 of European Patent Application No. 22 15 2066.1 filed on Jan. 18, 2022, which is expressly incorporated herein by reference in its entirety.

FIELD

The present disclosure relates to devices and methods for controlling a robot.

BACKGROUND INFORMATION

Robot devices may be trained for object manipulation using machine learning. This typically involves training a machine learning model to perform object detection like for example described in N. Carion et al., "End-to-end object detection with transformers," in European Conference on Computer Vision. Springer, 2020, pp. 213-229, herein referred to as reference 1.

In particular, object manipulation with a robotic arm is of a great interest, with a wide array of applications, e.g. in industrial manufacturing, or search & rescue. This may in particular include applications where there is a pile of objects, i.e., objects are not isolated and thus can be manipulated without affecting other objects, but may be stacked one on the other and care must be taken to avoid making a pile crash when removing a supporting object (and thus possibly damaging objects or hurting persons). Also with respect to efficiency of the robot operation, it may be desirable to respect object hierarchy (i.e., the mutual dependence of objects in terms of stacking order of the objects) since it may be easier and require less force to grasp an object from the top of a pile than trying to pull out an object from below.

Accordingly, reliable approaches for manipulating objects by a robot when multiple objects are arranged together in the workspace of the robot such that there are stacking relations between them (i.e., the objects are at least partially piled) are desirable.

SUMMARY

According to various embodiments of the present invention, a method for controlling a robot device is provided comprising acquiring at least one image of a plurality of objects in a workspace of the robot device; determining, by a neural network, object hierarchy information specifying stacking relations of the plurality of objects with respect to each other in the workspace of the robot device and confidence information for the object hierarchy information from the at least one image, if the confidence information indicates a confidence for the object hierarchy information above a confidence threshold, manipulating an object of the plurality of objects, if the confidence information indicates a confidence for the object hierarchy information lower than the confidence threshold acquiring an additional image of the plurality of objects and determining, by the neural network, additional object hierarchy information specifying stacking relations of the plurality of objects with respect to each other in the workspace of the robot device and additional confidence information for the additional object hierarchy information from the additional image and control the robot using the additional object hierarchy information.

By using the confidence information for the object hierarchy information, e.g., a probabilistic representation of the stacking relations (i.e. the object hierarchy) of the plurality of objects, the method described above provides a robust control in scenarios with dense object clutter (e.g., a pile of objects) since, if the confidence in object hierarchy information is not sufficient (i.e., below a confidence threshold), additional object hierarchy information is acquired and used (e.g. in combination with the object hierarchy information determined earlier). According to the method, robot control is performed using a data-driven approach, which can be generalized to many environments and types of objects. It for example is adaptable to multiple object grasping and pushing tasks within a densely cluttered environment, such as bin-clearing and specific object grasping, including grasping unknown objects.

The confidence information may be given in terms of probabilities (i.e., values between 0 and 1), for example for each stacking relation (i.e., for each (ordered) pair of objects). The confidence information being above a threshold may for example apply to the confidence with respect to a certain manipulation (e.g., the confidence that an object to be manipulated is not stacked below another object should be high for all other objects). In such a case, the confidence information being above a threshold may mean that the minimum confidence in all stacking relations relevant for the manipulation is above a predetermined confidence value limit (e.g., 0.8 i.e. 80% or 0.9, i.e. 90%). Two objects not being stacked may for example be represented by a value close to zero, e.g., 0.2 for a pair of a first object and a second object indicates that the first object is not stacked on the second object with a confidence (value) of $1-0.2=0.8$, i.e. 80%. Two objects being stacked may be analogously indicated by a confidence value close to 1 (the close to 1 the more confident). The confidence information being above a threshold may also mean that an overall confidence is above a confidence value limit or also that an average confidence (i.e. average over all stacking relations) is above a threshold etc. It should be noted that an object being stacked on another object does not necessarily mean that the object is completely located on the other object but it may also lean against the other object.

According to an example embodiment of the present invention, the neural network may be trained using supervised learning using for example training data comprising images with associated ground truth stacking relations.

In the following, various examples are given.

Example 1 is a method for controlling a robot device as described above.

Example 2 is the method of Example 1, comprising combining the object hierarchy information and the additional object hierarchy information to generate combined object hierarchy information and controlling the robot using the combined object hierarchy information.

Combining (e.g., fusing) the object hierarchy information gained from different images allows making the object hierarchy information more and more accurate when taking more and more images and, correspondingly, increasing the confidence in the object hierarchy information.

Example 3 is the method of Example 2, comprising combining the confidence information and the additional confidence information to generate confidence information for the combined object hierarchy information and controlling the robot using the combined object hierarchy information and the confidence information for the combined object hierarchy information.

Generating confidence information for the combined object hierarchy information allows judging whether the combined object hierarchy information is sufficient (i.e. the confidence in it is sufficient) or whether even more images should be taken.

Example 4 is the method of Example 2 or 3, comprising determining a first adjacency matrix representing the object hierarchy information and the confidence information, and determining a second adjacency matrix representing the additional object hierarchy information and the additional confidence information, wherein each entry of the first adjacency matrix and the second adjacency matrix specifies a stacking relation between an object associated with a row of the entry and an object associated with a column of the entry and the confidence in the stacking relation, and combining the object hierarchy information and the additional object hierarchy information comprises combining the first adjacency matrix and the second adjacency matrix.

The representation of object hierarchy information as matrices allows an efficient combination of the object hierarchy information and the additional object hierarchy information by matrix combination.

Example 5 is the method of Example 4, comprising combining the first adjacency matrix and the second adjacency matrix by an adjacency matrix combination comprising, for each adjacency matrix to be combined, performing an element-wise logit transformation of the adjacency matrix, summing the transformed adjacency matrices and applying an inverse logit transformation to the sum.

In this manner, the two matrices (or even a higher number of adjacency matrices determined from more than two images) may be combined in an efficient manner in accordance with Bayesian inference.

Example 6 is the method of any one of Examples 1 to 5, comprising, if the confidence information indicates a confidence for the object hierarchy information above a confidence threshold, determining an object of the plurality of objects to be manipulated from the object hierarchy information by determining an object on which none of the other objects is stacked and manipulating the determined object.

This allows safely clearing a pile of objects. The manipulation may for example include a grasping of the object. For this, a grasping quality may be determined using another neural network trained to determine grasp qualities for objects from one or more images.

Example 7 is a robot controller, configured to perform a method of any one of Examples 1 to 6.

Example 8 is a computer program comprising instructions which, when executed by a computer, makes the computer perform a method according to any one of Examples 1 to 6.

Example 9 is a computer-readable medium comprising instructions which, when executed by a computer, makes the computer perform a method according to any one of Examples 1 to 6.

BRIEF DESCRIPTION OF THE DRAWINGS

In the figures, similar reference characters generally refer to the same parts throughout the different views. The figures are not necessarily to scale, emphasis instead generally being placed upon illustrating the principles of the present invention. In the following description, various aspects are described with reference to the figures.

FIG. 6 shows a flow diagram illustrating a method for controlling a robot device according to an example embodiment of the present invention.

DETAILED DESCRIPTION OF EXAMPLE
EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
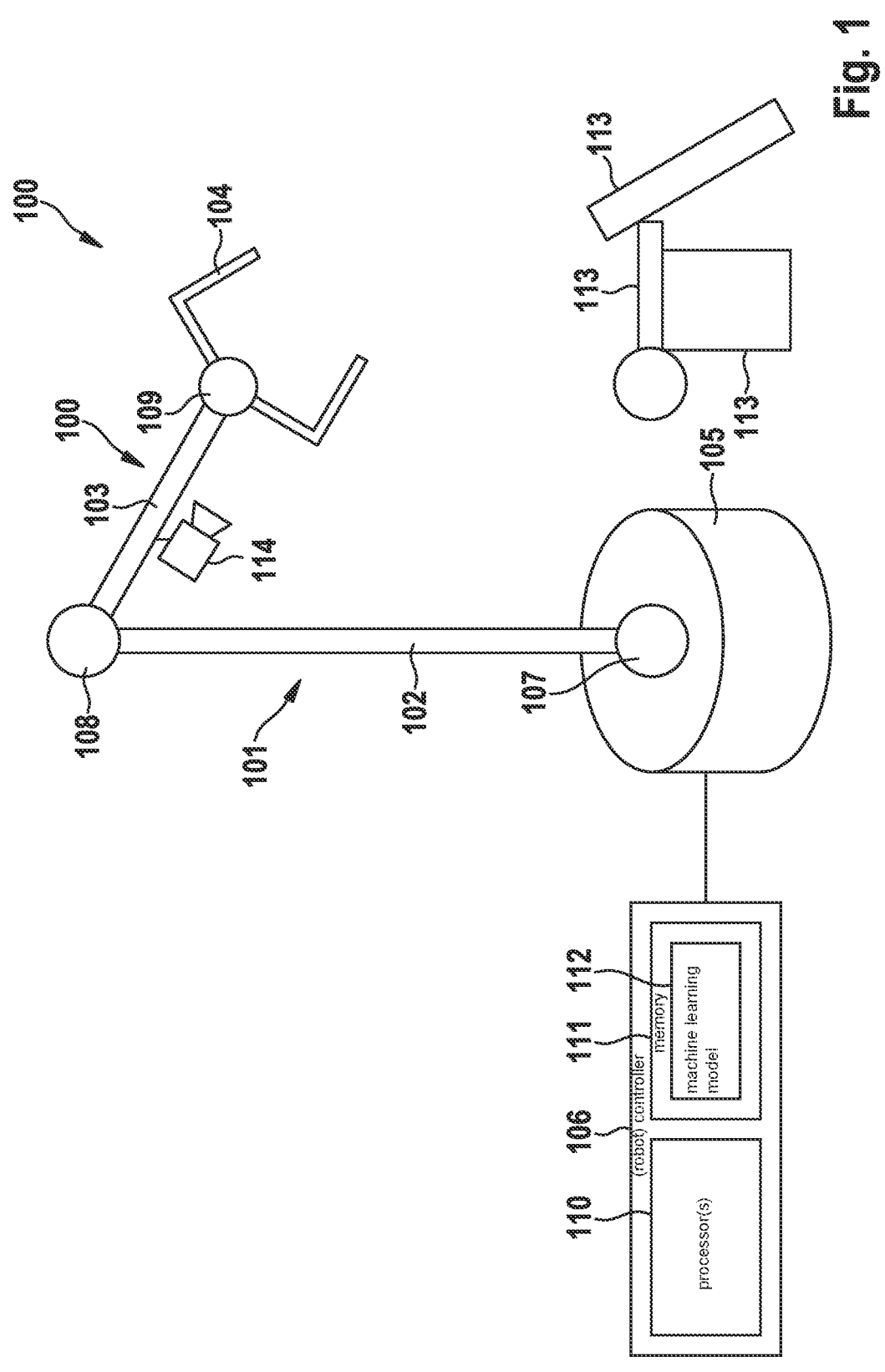
FIG. 1 shows a robot, according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and includes a grasping tool (which may also be a suction gripper).

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm.

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a machine learning model (e.g. including one or more neural networks) 112 stored in the memory 111.

For example, the robot's task is to perform bin-picking, i.e. grasp an object of multiple objects 113 (wherein grasping also includes picking up the object 113 with a suction cup) and, for example, show the object 113 to a scanner or move the object 113 to another bin. To be able to determine the object 113 to pick up and to determine a suitable grasping location on the object 113, the controller 106 uses images of the robot's workspace where the objects 113 are located. These images may be provided by a camera 114 attached to the robot arm 101 (or in any other way such that the controller may control the viewpoint of the camera 114).

When deciding which object to pick up, the controller 106 should, in some use cases, take into account object hierarchy, e.g. when there is a pile of objects. This means that the robot arm 101 should not pick up an object onto which another object is located which may fall and break when the robot arm 101 picks up the object supporting it. So, object hierarchy is herein meant to describe the relations between objects 113 that are stacked on top of each other (i.e. have a stacking relation), e.g. a first cup placed in a second cup, etc. In applications that require manipulating objects in a dense clutter, knowledge about object hierarchy allows for efficient manipulation (and avoiding damage to objects).

Typically, the data coming from a single image is partial, i.e. does not give complete information about the scene (e.g. only a view from the front but not from the back of an object pile). Therefore, inference of the object hierarchy from a single image (or few images) may be uncertain.

Approaches which do not take into account this uncertainty are error-prone and inflexible with regard to multi-view approaches. Model-driven approaches may perform well in specific scenarios, but typically do not generalize well to new environments unlike data-driven approaches.

According to various embodiments, a data-driven approach for object manipulation is provided, which takes into account the hierarchical structure of an object pile in a probabilistic manner, accounting for uncertainties in the inference, and utilizing multiple views of the environment to reduce these uncertainties. This means that the machine-learning model 112 whose output is used by the controller 106 to decide upon the next action (which may be grasping an object but also taking another image first to reduce uncertainty) reasons about the hierarchical structure of the objects 113 (e.g. an object pile).

Figure 2:
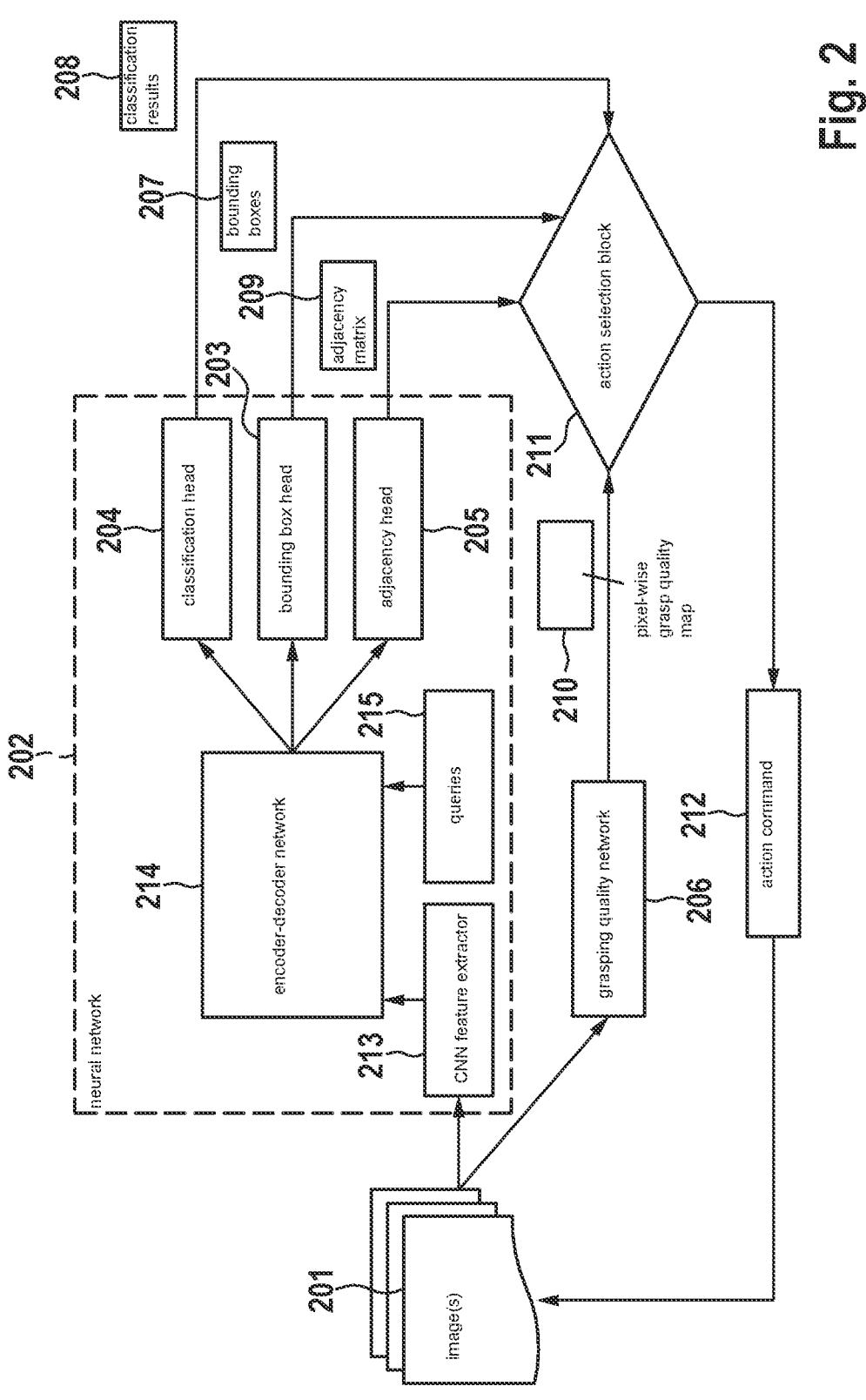
FIG. 2 illustrates an operation of the controller for a bin-picking task, according to an example embodiment of the present invention.

FIG. 2 illustrates an operation of the controller 106 for a bin-picking task.

The controller performs the following:

1. Take an image 201 of the scene (i.e. the robot's workspace including objects 113) by means of the camera 114.
2. s the image 201 through a neural network 202 to jointly predict N proposals for bounding boxes (by a bounding box head 203 of the neural network 202), class scores for the bounding boxes (by a classifier head 204 of the neural network 202), and a single adjacency matrix of size N×N (by an adjacency head 205 of the neural network 202).
3. Filter out the "None" classes from the object detector's output to produce a reduced output of bounding boxes 207, classes 208, and a smaller adjacency matrix 209.
4. Pass the image 201 through a grasping detector 206 to predict a pixel-wise grasping quality map (grasping quality image) 210.
5. Pass the grasping quality map 210, the bounding boxes 207, classes 208, and adjacency matrix 209 to an action selection block 211 (implemented by the controller 106) that indicates an action (212) to be performed from among three types of actions:
   Grasp an object.
   Push an object.
   View the environment (i.e. the workspace) from another viewpoint to improve certainty.
6. Control the robot arm 101 to perform the action selected by the action selection block 211.
7. Return to (1), i.e. take a new image 201 after the action.

The images 201 are for example RGB-D images (i.e. colour images with depth information). Other types of image data e.g. video, radar, LiDAR, ultrasonic, motion, thermal images, or sonar may also (alternatively or in addition) be used. These may be acquired by corresponding image sensors (cameras)

The action selector 211 uses the adjacency matrix 209 (in general object hierarchy information about the objects) to determine one or more of the following:
   The safest order of grabbing objects, e.g. for clusters of fragile objects.
   The best object to push to spread the clutter for efficient grasping, e.g. for object-specific grasping tasks.
   The best next viewpoint for the new image for improving the probabilistic representation of the scene.

The machine learning model 112 is trained by a machine-learning (ML) method (either by controller 106 or by another device from which it is then stored in the controller 106) for producing, from an image input, an adjacency matrix output representing a probabilistic object hierarchy graph.

For an image 201, the action selection block 211 utilizes the adjacency matrix for decision making in conjunction with the pixel-wise grasp quality map 210. According to various embodiments, the action selection block 211 is trained for this in the manner of a Reinforcement Learning agent.

Figure 3:
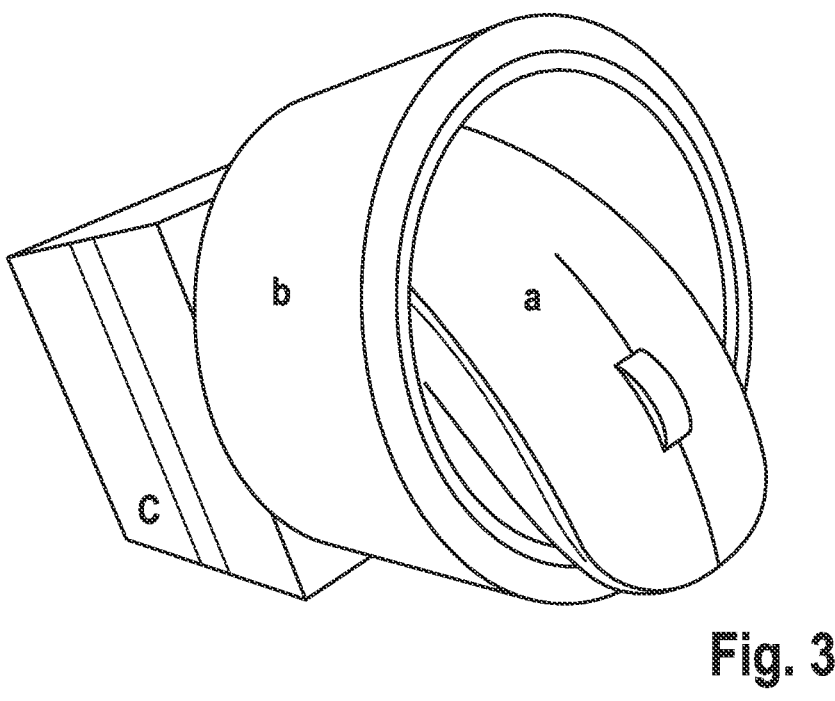
FIG. 3 shows an exemplary scenario with three objects.

FIG. 3 shows an exemplary scenario with three objects, a mouse (denoted as object a), a duct-tape roll (denoted as object b) and a box (denoted as object c).

The object hierarchy can be represented as a directed graph. A directed graph $\mathcal{G} \triangleq \{V, \varepsilon\}$ is a set of vertices V connected with directed edges $\varepsilon$. If the object hierarchy is certain, this representation suffices for capturing the relationship between the objects. Each vertex represents an object, and each edge represents the stacking relationship between connected vertices. For example, object b is placed above object a, therefore it is represented as $v_a$ and $v_b$ with an edge $\epsilon_{ba}$ stretching from b to a, where $v\varepsilon \mathcal{V}$ and $\epsilon\in\varepsilon$. However, if the hierarchy is unknown and is inferred from incomplete data, e.g. images of a scene, this representation is insufficient and prone to errors due to uncertainty in inference. Therefore, according to various embodiments, the object hierarchy is represented as a weighted directed graph $\mathcal{G} \triangleq \{V, \varepsilon, \mathcal{W}\}$, where each edge $\epsilon \in V$ has a weight attached co, $\omega_\epsilon \in \mathcal{W}$. The weight is the probability the edge exists given image I, i.e. the probability that the corresponding objects stack in the direction of the edge:

$$\omega_\epsilon \triangleq \mathbb{P}(\epsilon | I)$$

It should be noted that as a probability, $A_{i,j}$'s support is between 0 and 1. Also, the diagonal elements are all equal to 0.

Figure 4:
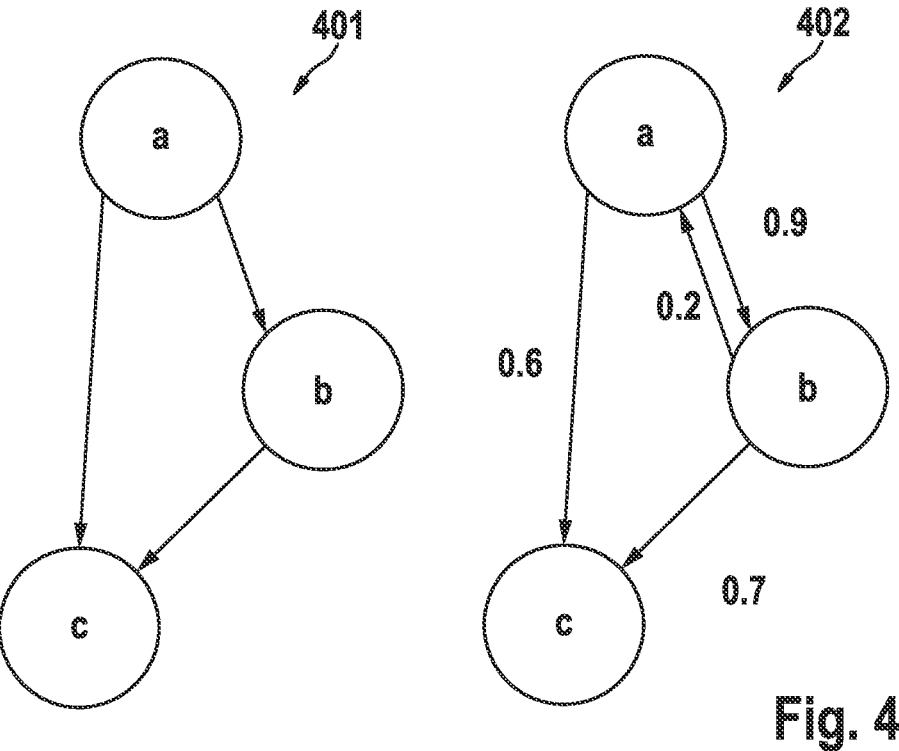
FIG. 4 shows a ground truth object hierarchy graph and an example for an estimated object hierarchy graph for the three-object scenario of FIG. 3, according to an example embodiment of the present invention.

FIG. 4 shows a ground truth object hierarchy graph 401 and an example for an estimated object hierarchy graph (with probabilistic, i.e. confidence, information) 402 for the three-object scenario of FIG. 3. The ground truth graph 401 specifies that object a is directly on top of both object b and c and the estimated object hierarchy graph 402 gives an estimation with probabilistic edge weights expressing the confidence of the respective relations between the objects.

According to various embodiments, an object hierarchy graph $\mathcal{G}$ is represented in a form of an adjacency matrix, denoted as $A(\mathcal{G})$ or simply as A to shorten notations. The adjacency matrix is a square matrix with dimensions $N_V \times N_V$, where $N_V$ is the number of vertices, i.e. objects detected in the scene. Each element $A_{i,j}$ corresponds to the edge from objects i to j:

$$A_{i,j} = \omega_\epsilon^{ij} \triangleq \mathbb{P}(\epsilon_{ij} | I).$$

In the example of FIG. 4, the ground truth adjacency matrix corresponding to the ground truth object hierarchy graph is $$A = \begin{bmatrix} 0 & 1 & 1 \\ 0 & 0 & 1 \\ 0 & 0 & 0 \end{bmatrix},$$

while the estimated adjacency matrix representing the estimate object hierarchy graph is:

$$A = \begin{bmatrix} 0 & 0.9 & 0.6 \\ 0.2 & 0 & 0.7 \\ 0 & 0 & 0 \end{bmatrix}.$$

The representation of object hierarchy as an adjacency matrix has properties that are useful for applications like bin-picking: the n'th moment of the matrix, i.e. $A^n$, represent the probability of the objects being connected via a n'th degree connection. For example, consider three objects a, b, and c that are stacked from top (object a) to bottom (object c). Then, $(A_{a,c})^2$ represents the probability of object a stacked above object c with an intermediary object in-between, in this case object b.

With the above example from previous paragraph, the ground truth second moment matrix is:

$$A = \begin{bmatrix} 0 & 0 & 1 \\ 0 & 0 & 0 \\ 0 & 0 & 0 \end{bmatrix},$$

where object a is supported also by object c through b. The second moment of the estimated adjacency matrix is:

$$A^2 = \begin{bmatrix} 0.18 & 0 & 0.63 \\ 0 & 0.18 & 0.12 \\ 0 & 0 & 0 \end{bmatrix},$$

where the off-diagonal elements represent the probability of being second degree supported, and the diagonal elements represent that there are loops in the estimated object hierarchy graph 402.

In a scenario when grasping the top objects to bottom is crucial, e.g. for fragile objects, the probabilistic representation allows the controller to determine the safest object to grasp given the image I. To do so, it (e.g. the actions selection block 211) computes the probability of an object i not being stacked above other objects $\mathbb{P}(\neg\epsilon_i | I)$, i.e:

$$\mathbb{P}(\neg \epsilon_i | I) = \prod_j (1 - \mathbb{P}(\epsilon_{j,i} | I)) = \prod_j (1 - A_{j,i}).$$

This probability for all objects can be computed in a batch via $$\log(\mathbb{1}_{N_V} \times N_V - A^T) \cdot \mathbb{1}_{N_V} = \log \mathbb{P}(\neg\epsilon | I),$$

where $\mathbb{P}(\neg\epsilon | I) \triangleq [\mathbb{P}(\neg\epsilon_1 | I), \ldots, \mathbb{P}(\neg\epsilon_{N_V} | I)]^T$ and $\mathbb{1}$ represents a vector or matrix of ones with the dimensions in the subscript. Then, the safest object to grasp is the object which corresponds to the maximum value of $\mathbb{P}(\neg\epsilon | I)$.

In the example of FIG. 3, $\mathbb{P}(\neg\epsilon | I) = [0.8, 0.1, 0.18]^T$, thus object a is the safest to grasp first.

As mentioned above, the action selection block 211 may decide to take another image. From this additional image, the controller 106 may calculate another (i.e. additional) corresponding adjacency matrix 209 which the action selection block 211 uses for deciding about the next action. However, since a single image of the scene might not suffice for inferring the spatial relationship between the objects, the additional image alone may also not provide object hierarchy information with sufficient confidence to decide about a picking (or shifting) action. Therefore, according to various embodiments, the action selection block 211 uses the object hierarchy information from the earlier image (or multiple earlier images) by performing a data fusion from multiple images, i.e. perform (sequential) inference from multiple views.

The probabilistic nature of A gives the possibility for sequential inference from multiple views. Consider the posterior probability of object i being placed directly over object j from n images; Assuming uninformative priors for the images and the adjacency matrix, the posterior is proportional to the product of all the edge's probabilities. On a matrix level, this is an element-wise operation:

$$A_{i,j}^{post} \triangleq \mathbb{P}(\epsilon_{ij} | I_{1:n}) \propto \prod_A A_{i,j}.$$

A possible scheme for the action selection block 211 to compute the posterior matrix is to perform an element-wise logit transformation for each adjacency matrix:

$$\overline{A}_{i,j} \triangleq \log\left(\frac{A_{i,j}}{1 - A_{i,j}}\right)$$

then it computes the logit posterior as the sum of all individual logit-transformed adjacency matrices:

$$\bar{A}_{i,j}^{post} = \sum_{\bar{A}} \bar{A}_{i,j},$$

and finally applies the inverse logit transformation:

$$A_{i,j}^{post} = \frac{\exp(\bar{A}_{i,j}^{post})}{1 + \exp(\bar{A}_{i,j}^{post})}$$

The action selection block 211 can apply this scheme to incrementally update the posterior adjacency matrix in the logit space. The posterior matrix's values in general are closer to 0 and 1 compared to each individual matrix, which constitutes to a more certain adjacency matrix (i.e. with higher confidence). Then, the action selection block 211 can utilize this matrix for action selection instead of the individual matrix 209 for a single image 201, allowing for a safer decision for object manipulation.

As an example, consider two adjacency matrix estimations $$A = \begin{bmatrix} 0 & 0.9 & 0.6 \\ 0.2 & 0 & 0.7 \\ 0 & 0 & 0 \end{bmatrix} \text{ and }$$

$$A = \begin{bmatrix} 0 & 0.9 & 0.9 \\ 0 & 0 & 0.8 \\ 0 & 0 & 0 \end{bmatrix}.$$

Using the process detailed above, the posterior $A^{post}$ created from the two matrices is:

$$A^{post} = \begin{bmatrix} 0 & 0.987 & 0.931 \\ 0 & 0 & 0.903 \\ 0 & 0 & 0 \end{bmatrix}.$$

In the posterior the values in general are closer to the ground truth than in the individual matrices.

For a neural network (NN) to produce an adjacency matrix output A from an input matrix X of $N_V$ feature vectors of size $N_f$ corresponding to $N_V$ objects, the output must be agnostic to the objects' ordering, i.e. for different ordering of objects, the corresponding elements in the adjacency matrices must be identical. Therefore, according to an embodiment, a neural network generating the adjacency matrix (e.g. adjacency head 205) includes a matrix multiplication operation to ensure that the output is ordering agnostic, leading to an $N_V \times N_V$ adjacency matrix. After the multiplication, an element-wise sigmoid operation is performed, such that each element in the output is between 0 and 1. The network mathematical operation is described as follows:

$$A = \text{Sigmoid}\left( \frac{f_1(X)^T \cdot f_2(X)}{N_f} \right),$$

$f_1(\cdot)f_2(\cdot)N_f f_1(\cdot)f_2(\cdot)X256\times100f_1(X)f_2(X)256\times100100\times 100$ where and are nonlinear functions of the input that keep the input's dimensions, and the division by counters the vanishing gradient problem of the Sigmoid function during learning. The learned parameters are contained within and. For example, 's dimensions are and subsequently and are both of dimensions $f_1(\cdot)f_2(\cdot)N_f f_1(\cdot)f_2(\cdot)X256\times100f_1(X)f_2(X)$ $256\times100100\times100$. The multiplication leads to a resulting matrix with dimensions, and afterwards the element-wise Sigmoid operation turns the matrix into adjacency matrix.

The probabilistic representation of the object hierarchy, in the above embodiment in the form of the adjacency matrix 209 (including probabilistic weights) allows, in contrast to approaches that only presented a non-weighted directed graph representation of the object hierarchy, to reason about the uncertainty within the object hierarchy inference. This allows robust control. Furthermore, the adjacency matrix representation opens the possibility of quantifying the spread of an object clutter via its sparsity. A sparse adjacency matrix represents that there are only a few to none object stacking instances in the workspace. The controller 106 (specifically the action selection block 211) may further choose actions that may create greater sparsity in the clutter for easier grasping.

Furthermore, the action selection block 211 may compute the moments of the adjacency matrix to gain information assisting in action efficiency for clearing clutter, by indicating which object should be interacted with for the greatest influence (e.g. scattering).

Thus, the flexibility and the properties of the adjacency matrix representation open a wide array of potential applications and the controller 106 may utilize the adjacency matrix representation to control the robot arm 101 to perform tasks with high efficiency and accuracy.

According to various embodiments, the neural network 202 comprises a transformer-based object detector like described in reference 1. It comprises a CNN (convolutional neural network feature extractor 213 followed by an encoder-decoder network 214. The encoder-decoder network 214 is supplied with queries 215 which can be seen to specify areas of the input images where the neural network 202 looks for objects. The number of queries is for example a predefined hyper parameter but the parameters of the queries (i.e. image locations) may be learned during training of the neural network 202. The encoder-decoder network 214 produces (for example) 100 bounding box candidates, each as a feature vector with length of 256. The feature vectors are fed into the bounding box head 203 outputting a length 4 vector of bounding box coordinates.

The classification head 204 of the detector is trained for classification of bounding boxes (e.g. in a supervised data from training objects with ground truth labels). The bounding box head 203 may similarly be trained using training images with ground truth data.

The adjacency head 205 is trained to produce the adjacency matrix in a supervised manner from a dataset of stacked objects with known hierarchy between them, e.g., the VMRD (Visual Manipulation Relationship Dataset) or REGRAD (Relational Grasp Dataset) datasets, e.g. to produce an adjacency matrix with dimensions 100×100.

The CNN feature extractor 213 and the encoder-decoder network 214 may be trained separately or together with one or more the heads 203, 204, 205 (e.g. using a combined loss). For example, the CNN feature extractor 213 and the encoder-decoder network 214 may be trained together with the bounding box head 203 in supervised manner using bipartite matching loss (between predicted bounding boxes and ground truth bounding boxes). The bipartite matchings are for example produced via the Hungarian-Matching algorithm.

The grasping quality network 206, such as a GG-CNN (Generative Grasping CNN) is trained to outputs pixel-wise grasping maps.

An example for a structure of the adjacency head 205 is as follows: the 100 feature vectors, collected to a 256×100 block, are split into two tracks. On each track, they pass through a separate Multi-Level Perceptron (MLP) layer each. Both of the MLPs keep the same dimensions of the input. Then, in one of the tracks the 256×100 block passes a transpose operation, and is multiplied with the block from the other track to create a 100×100 adjacency matrix. Finally, the adjacency matrix passes through a Sigmoid layer to limit each element between 0 and 1. During the detector's training process, Hungarian Matching is used to pair between bounding-box proposals and the training set's ground truth boxes. This matching is used to reduce the 100×100 adjacency matrix to a reduced adjacency by selecting the elements that correspond to the matcher's selection. During test time, the important elements in the adjacency matrix correspond to the boxes with corresponding classes that are not empty.

As explained above, the action selection block 211 determines the type and the specifics of the action executed. It receives the classification results 208, bounding boxes 207, adjacency matrix 209 and pixel-wise grasp quality map 210. Its output is an action command with its specifics, e.g. grasping pose and opening for the grasping action. It can be rule-based, a neural network (NN) based model, or any other model. A simple example for a rule-based action selection can be as follows: the action is determined by the average information entropy of all elements in the adjacency matrix, and the highest grasp quality. If the information entropy is low (i.e. elements in the matrix are close to 0 or 1), and the grasp quality is high, grasp an object that does not support others. If the information entropy is low and the grasp quality is low, perform a push on the bottom-most object. Finally, if the information entropy is high, take an image from a different viewpoint.

Figure 5:
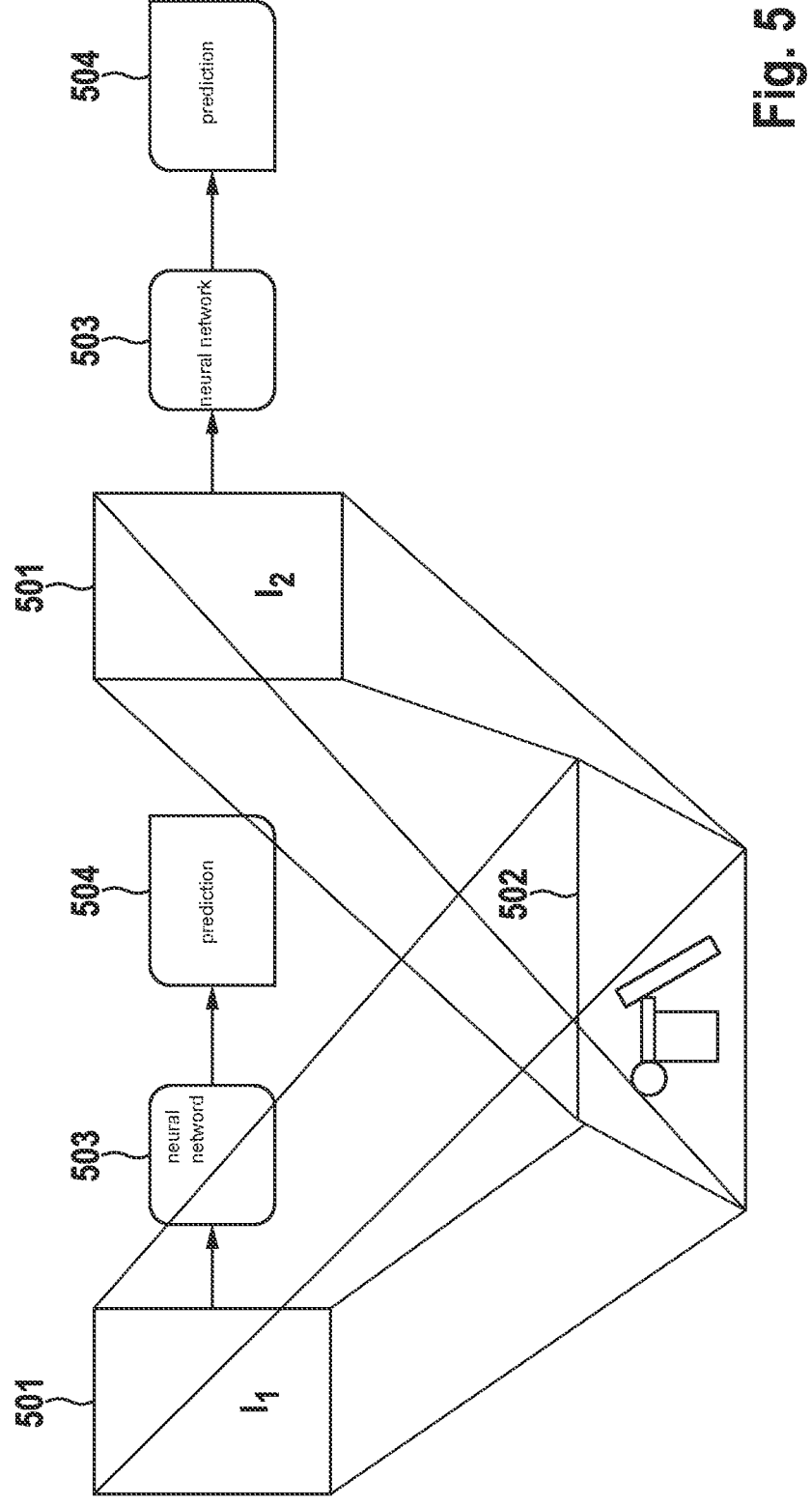
FIG. 5 illustrates taking images of a scene from different viewpoints, according to an example embodiment of the present invention.

FIG. 5 illustrates taking images 501 of a scene 502 from different viewpoints to create, by means of a neural network 503 as described above, an object hierarchy estimate for each view (in the form of an adjacency matrix) which can then be fused to an object hierarchy estimate with higher confidence.

An image of the scene 502 is first taken from a first viewpoint to produce an image $I_1$. This image passes through the neural network 503 and leads to a prediction (504) that object a is on top of object b with probability $\mathbb{P}(\epsilon_{ab}|I_1)$. As this probability is not enough for interaction, the controller 106 determines (action selection block 211) that the next action is to take another image from a second viewpoint to get an image $I_2$. The image $I_2$ is then passed through the neural network 503 system, giving object hierarchy information $\mathbb{P}(\epsilon_{ab}|I_2)$ The action selection block 211 fuses the object hierarchy information $\mathbb{P}(\epsilon_{ab}|I_1)$ and $\mathbb{P}(\epsilon_{ab}|I_2)$ into $\mathbb{P}(\epsilon_{ab}|I_{1,2})$ (via, e.g., the logit transformation scheme described above), and as the value of this is for example large decides that an interaction is to be performed (e.g. grasping or pushing).

In summary, according to various embodiments, a method for controlling a robot device is provided as illustrated in FIG. 6.

FIG. 6 shows a flow diagram 600 illustrating a method for controlling a robot device according to an embodiment.

In 601, at least one image of a plurality of objects in a workspace of the robot device is acquired.

In 602, object hierarchy information specifying stacking relations of the plurality of objects with respect to each other in the workspace of the robot device and confidence information for the object hierarchy information are acquired from the at least one image by a neural network.

In 603, if the confidence information indicates a confidence for the object hierarchy information above a confidence threshold, an object of the plurality of objects is manipulated.

In 604, if the confidence information indicates a confidence for the object hierarchy information lower than the confidence threshold an additional image of the plurality of objects is acquired and additional object hierarchy information specifying stacking relations of the plurality of objects with respect to each other in the workspace of the robot device and additional confidence information for the additional object hierarchy information are acquired from the additional image by the neural network.

In 605, the robot is controlled using the additional object hierarchy information.

The acquiring of additional object hierarchy information and corresponding (additional) confidence information may be repeated until the confidence is sufficient (i.e. is above the confidence threshold). So, images may be repeatedly acquired until confidence is sufficient and an object is manipulated. In each iteration, (in particular the single iteration described in FIG. 6), the method may comprise comparing the confidence information with the threshold, i.e. determining whether the confidence information is above or below the threshold, i.e. whether the confidence is sufficient or insufficient with respect to a confidence criterion (e.g. confidence limit).

According to various embodiments, the additional image is taken from another viewpoint of the workspace of the robot than the at least one image. So, in case the model (either the adjacancy head or another part) is uncertain in its ability to accurately and safely preform the (grasp or shift) manipulation, an additional image is taken from another viewpoint. This viewpoint may be one that maximizes the information gain that might arise from this manipulation. This information gain is propagated to the object hierarchy information (e.g. leading to a more accurate adjacency graph) and increases the success probability of the next action (grasp or shift).

While in the above embodiments, the approach of FIG. 6 is applied to control of a robot arm, it may be applied for computing a control signal for controlling any technical system in a scenario where object hierarchy plays a role, like e.g. a computer-controlled machine, like a robot, a vehicle, a domestic appliance, a power tool, a manufacturing machine, a personal assistant or an access control system.

According to one embodiment, the method is computer-implemented.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments disclosed herein.

What is claimed is:

1. A method for controlling a robot device, comprising the following steps:

acquiring at least one image of a plurality of objects in a workspace of the robot device;

determining, by a neural network, a first adjacency matrix representing object hierarchy information specifying stacking relations of the plurality of objects with respect to each other in the workspace of the robot device, and representing confidence information for the object hierarchy information from the at least one image;

when the confidence information indicates a confidence for the object hierarchy information above a confidence threshold, manipulating an object of the plurality of objects;

when the confidence information indicates a confidence for the object hierarchy information lower than the confidence threshold, acquiring an additional image of the plurality of objects and determining, by the neural network, a second adjacency matrix representing additional object hierarchy information specifying stacking relations of the plurality of objects with respect to each other in the workspace of the robot device, and representing additional confidence information for the additional object hierarchy information from the additional image, wherein each entry of the first adjacency matrix and the second adjacency matrix specifies a stacking relation between an object associated with a row of the entry and an object associated with a column of the entry and specifies the confidence in the stacking relation between the object associated with the row of the entry and the object associated with the column of the entry;

combining the first adjacency matrix and the second adjacency matrix; and controlling a physical action of the robot device using the combination of the first adjacency matrix and the second adjacency matrix.

2. The method of claim 1, wherein the combining of the first adjacency matrix and the second adjacency matrix by an adjacency matrix combination includes, for each adjacency matrix to be combined, performing an element-wise logit transformation of the adjacency matrix, summing the transformed adjacency matrices and applying an inverse logit transformation to the sum.

3. The method of claim 1, further comprising, when the confidence information indicates the confidence for the object hierarchy information above the confidence threshold, determining an object of the plurality of objects to be manipulated from the object hierarchy information by determining an object on which none of the other objects is stacked and manipulating the determined object.

4. A controller configured to control a robot device, the controller configured to:

acquire at least one image of a plurality of objects in a workspace of the robot device;

determine, by a neural network, a first adjacency matrix representing object hierarchy information specifying stacking relations of the plurality of objects with respect to each other in the workspace of the robot device, and representing confidence information for the object hierarchy information from the at least one image;

when the confidence information indicates a confidence for the object hierarchy information above a confidence threshold, manipulate an object of the plurality of objects;

when the confidence information indicates a confidence for the object hierarchy information lower than the confidence threshold, acquire an additional image of the plurality of objects and determining, by the neural network, a second adjacency matrix representing additional object hierarchy information specifying stacking relations of the plurality of objects with respect to each other in the workspace of the robot device, and representing additional confidence information for the additional object hierarchy information from the additional image, wherein each entry of the first adjacency matrix and the second adjacency matrix specifies a stacking relation between an object associated with a row of the entry and an object associated with a column of the entry and specifies the confidence in the stacking relation between the object associated with the row of the entry and the object associated with the column of the entry;

combine the first adjacency matrix and the second adjacency matrix; and control a physical action of the robot device using the combination of the first adjacency matrix and the second adjacency matrix.

5. A non-transitory computer-readable medium on which are stored instructions for controlling a robot device, the instruction, when executed by a computer, causing the computer to perform the following steps:

acquiring at least one image of a plurality of objects in a workspace of the robot device;

determining, by a neural network, a first adjacency matrix representing object hierarchy information specifying stacking relations of the plurality of objects with respect to each other in the workspace of the robot device, and representing confidence information for the object hierarchy information from the at least one image;

when the confidence information indicates a confidence for the object hierarchy information above a confidence threshold, manipulating an object of the plurality of objects;

when the confidence information indicates a confidence for the object hierarchy information lower than the confidence threshold, acquiring an additional image of the plurality of objects and determining, by the neural network, a second adjacency matrix representing additional object hierarchy information specifying stacking relations of the plurality of objects with respect to each other in the workspace of the robot device, and representing additional confidence information for the additional object hierarchy information from the additional image, wherein each entry of the first adjacency matrix and the second adjacency matrix specifies a stacking relation between an object associated with a row of the entry and an object associated with a column of the entry and specifies the confidence in the stacking relation between the object associated with the row of the entry and the object associated with the column of the entry;

combining the first adjacency matrix and the second adjacency matrix; and controlling a physical action of the robot device using the combination of the first adjacency matrix and the second adjacency matrix.

* * * * *